(12) United States Patent  
Ehrle et al.

(10) Patent No.: US 9,393,649 B2  
(45) Date of Patent: Jul. 19, 2016

(54) MACHINE BLADE FOR FOOD PROCESSING

(75) Inventors: Egon Ehrle, Schoneiche (DE); Andreas Gebert, Chemnitz (DE)

(73) Assignees: BE MASCHINENMESSER GMBH & CO. KG, Spreenhagen (DE); CEWOTEC GGMBH, Chemnitz (DE); SLAYER BLADES S.R.L., Oggiona S. Stefano (IT)

( * ) Notice: Subject to any disclaimer, the term of this patent is extended or adjusted under 35 U.S.C. 154(b) by 777 days.

(21) Appl. No.: 13/700,338

(22) PCT Filed: May 26, 2011

(86) PCT No.: PCT/EP2011/058681  
§ 371 (c)(1),  
(2), (4) Date: Apr. 8, 2013

(87) PCT Pub. No.: WO2011/147936  
PCT Pub. Date: Dec. 1, 2011

(65) Prior Publication Data  
US 2013/0192441 A1    Aug. 1, 2013

(30) Foreign Application Priority Data  
May 26, 2010   (DE) .................. 20 2010 007 393 U

(51) Int. Cl.  
*B23P 15/28*        (2006.01)  
*B23K 10/02*       (2006.01)  
(Continued)

(52) U.S. Cl.  
CPC ............... *B23P 15/28* (2013.01); *B23K 10/027* (2013.01); *B23K 31/025* (2013.01);  
(Continued)

(58) Field of Classification Search  
CPC ....... B23P 15/28; B23P 15/40; B23K 10/027; B23K 31/025; B23K 35/3086; B23K 2203/04; B23K 2203/18; B23K 2201/20; B26D 1/14; B26D 1/0007; B26D 2001/002; B26D 2001/0053; B26D 2210/02; Y10T 83/929; C21D 10/00; C21D 2251/04  
See application file for complete search history.

(56) References Cited

U.S. PATENT DOCUMENTS

| 1,516,471 A | 11/1924 | Stoody et al. |
| 1,919,358 A | 7/1933 | Bem |
| 2007/0163128 A1* | 7/2007 | Tarrerias ................ B23D 65/00 30/350 |

FOREIGN PATENT DOCUMENTS

| DE | 3219260 | 11/1983 |
| DE | 195 30 641 C1 | 11/1996 |

(Continued)

OTHER PUBLICATIONS

Eckart Uhlmann, et al. "Die Kraft des Schalls"; Messermagazin May 2007; Oct./Nov. 2007, Oct. 31, 2007, Seiten 68-70 URL: http://www.kan-tech.com/UltraschallschmiedenKan-Tech_2007.pdf.

(Continued)

*Primary Examiner* — Moshe Wilensky  
(74) *Attorney, Agent, or Firm* — Sheridan Ross P.C.

(57) ABSTRACT

The present invention relates to a blade for cutting machines and to a method for producing such a blade. The blade has a main body made of a first material and a cutting body made of a second material and having at least one cutting edge formed thereon. The second material has a higher hardness than the first material. The cutting body is joined along a joining line to the main body. According to the invention, the blade is produced by: a) providing a support made of a third material of high thermal conductivity; b) placing the main body on the support such that a base area of the main body and a surface of the support lie substantially parallel to each other and the joining line is adjacent the surface of the support; c) generating the cutting body by build-up welding of the second material onto the first material along the joining line, the support being arranged for mechanically supporting the second material used for build-up welding and d) sharpening the cutting body to form the at least one cutting edge.

16 Claims, 3 Drawing Sheets

Figure 1:
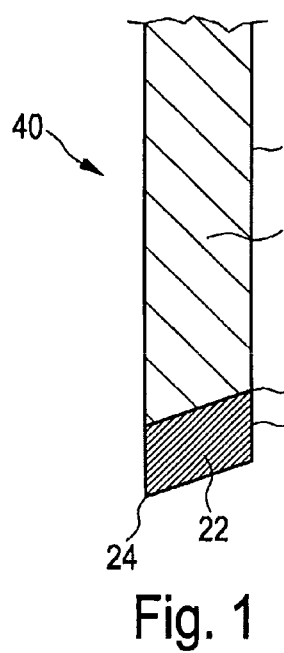

(51) Int. Cl.
  *B23K 31/02* (2006.01)
  *B23K 35/30* (2006.01)
  *B23P 15/40* (2006.01)
  *B26D 1/00* (2006.01)
  *B26D 1/14* (2006.01)
  *C21D 10/00* (2006.01)

(52) U.S. Cl.
  CPC ............ *B23K 35/3086* (2013.01); *B23P 15/40* (2013.01); *B26D 1/0006* (2013.01); *B26D 1/14* (2013.01); *B23K 2201/20* (2013.01); *B23K 2203/04* (2013.01); *B23K 2203/18* (2013.01); *B26D 2001/002* (2013.01); *B26D 2001/0033* (2013.01); *B26D 2001/0053* (2013.01); *B26D 2210/02* (2013.01); *C21D 10/00* (2013.01); *C21D 2251/04* (2013.01); *Y10T 83/929* (2015.04)

(56) References Cited

FOREIGN PATENT DOCUMENTS

| | | |
|---|---|---|
| DE | 203 13 038 | 10/2003 |
| DE | 20 2007 011 503 U1 | 10/2007 |
| EP | 0 558 870 A1 | 9/1993 |
| EP | 1 378 328 A2 | 1/2004 |
| JP | 61 150778 A | 7/1986 |
| JP | 61150778 | 7/1986 |
| JP | 11 221671 A | 8/1999 |
| JP | 11207488 | 8/1999 |
| JP | 2010260000 A * | 11/2010 |
| RU | 2014134 | 6/1994 |
| RU | 2113963 | 6/1998 |

OTHER PUBLICATIONS

International Search Report prepared by the European Patent Office on Sep. 19, 2011, for International Application No. PCT/EP2011/058681.

Written Opinion prepared by the European Patent Office on Sep. 19, 2011, for International Application No. PCT/EP2011/058681.

Official Action for Russian Patent Application No. 2012156870102 089764, dated Dec. 16, 2014, 7 pages.

Search Report for German Patent Application No. 202010007393.6 dated Jul. 1, 2011, 3 pages.

* cited by examiner

MACHINE BLADE FOR FOOD PROCESSING

CROSS REFERENCE TO RELATED APPLICATIONS

This application is a national stage application under 35 U.S.C. 371 and claims the benefit of PCT Application No. PCT/EP2011/058681 having an international filing date of 26 May 2011, which designated the United States, and which PCT application claimed the benefit of German Patent Application No. 202010007393.6 filed 26 May, 2010.

The present invention relates to a blade for cutting machines and to a method for producing a blade for cutting machines. The present invention relates in particular to a machine blade for food processing.

Machine blades are used, for example, for comminution and/or mixing of starting materials, in particular of foods such as meat, cheese, sausage, vegetables and fruit, of biomass, or other such starting materials. Blades for cutting machines are also used, indirectly at least, for conveying the aforementioned starting materials within a processing vessel. The geometry and structure of the blade are adapted to a respective processing task.

Due to the particularly high stresses and loads to which they are exposed, blades have only a short service life in many cases and are therefore dismantled and resharpened after a few hours. It is known, for example, that blades used for comminution of meat with bone attached are resharpened in some circumstances after only three hours in operation.

A general aim is to produce blades made of materials that not only withstand strong shearing forces but also have a high edge retention, that is to say, blades that have a high hardness, high toughness and a long service life.

A blade for use in food cutting machines, comprising a main blade body and an associated cutting body with cutting edges formed thereon is known from German utility model specification DE 203 13 038 U1. This publication proposes that the cutting body be selectively joined non-positively to the main blade body by means of a gluing, welding or soldering technique, using soft force-distributing filler materials or also using rivets.

A basic technical problem addressed by the present invention is that of providing a blade for cutting machines, which excels over prior art blades by having a longer service life, in particular.

According to a first aspect of the invention, the aforesaid technical problem is solved by a blade for cutting machines which has a main body made of a first material and a cutting body made of a second material and having at least one cutting edge formed thereon, wherein the second material has a higher hardness than the first material and the cutting body is joined along a joining line to the main body. The blade according to the invention obtains its properties from the method by which it is produced, said method comprising the following steps:

providing a support made of a third material of high thermal conductivity;

placing the main body on the support such that a base area of the main body and a surface of the support lie substantially parallel to each other and the fit location is adjacent the surface of the support;

generating the cutting body by build-up welding of the second material onto the first material along the joining line, the support being arranged for mechanically supporting the second material used for build-up welding and sharpening the cutting body to form the at least one cutting edge.

The present invention includes the realization that supports, such as ceramic backing, which have a lower thermal conductivity and are used in the production of prior art blades for cutting machines, have adverse effects on the quality of prior art blades.

Due to the main body of the blade according to the invention being placed during the build-up welding of the second material onto a support made of a third material having a high thermal conductivity, the cutting body of the inventive blade has a particularly high surface quality. The high thermal conductivity of the third material of the support, which is typically within the thermal conductivity range of metals, causes any heat in the main body and above all in the cutting body to be rapidly dissipated to the support. The support is thus a heat-dissipating support. Any diffusion process and/or other process of material transport between the main body and the cutting body is largely prevented, therefore, with the result that a semi-discontinuous leap in the values of material-specific parameters can be observed along the joining line between the main body and the cutting body. Thus, in one embodiment of the blade according to the invention, the percentage content of the first material in the second material of the cutting body is no more than 5%.

The blade according to the invention has fewer pores in the cutting body and has fewer bond defects than is the case in prior art blades.

The support made of the third material having a high thermal conductivity functions like a weld pool backing and also as a means of cooling the main body and the cutting body during build-up welding and after build-up welding, in other words as a heat sink.

The blade according to the invention is distinguished, in particular, by a very long service life that is extended by a factor of between two and five in comparison with the service life of comparable blades.

Furthermore, rapid dissipation of heat from the main body and the cutting body to the support allows a very narrow cutting body and hence the formation of a cutting body of especially high quality.

The aforementioned advantages cannot be achieved with known blade production methods in which ceramic backing, for example, i.e., supports made of materials having a low thermal conductivity, are used for weld pool backing.

The material of the main body is a commercially available corrosion-resistant steel, for example.

Other embodiments of the inventive blade shall now be described. The additional features of these additional embodiments may be combined with each other to form other embodiments and/or with the optional features already mentioned above, unless these are explicitly described as alternatives to each other.

The cutting body is preferably generated by plasma-powder build-up welding. The second material of the cutting body is preferably an iron alloy.

The cutting body can also be generated by laser-powder build-up welding. The required melting process is carried out, for example, using a laser-powder build-up welding plant. Furthermore, the support does not necessarily need to have a high thermal conductivity if the cutting body is generated using laser-powder build-up welding.

The advantage of the variant involving laser-powder build-up welding is that less heat input into the main body and/or the support is caused. This is attributable, above all, to the relatively fine beam of fused powder. The diffusion process and/or other process of material transport between the main body and the cutting body is prevented even more extensively in this respect, with the result that a semi-discontinuous leap in the values of material-specific parameters can be observed along the joining line between the main body and the cutting body.

Copper or copper alloy is suitable and preferred as material for a support with high thermal conductivity (i.e., as the third material).

The thermal conductivity of the third material is advantageously higher than that of the first and the second material. This variant is specifically preferred whenever the cutting body is generated by means of plasma-powder build-up welding, as the thermal input is typically higher in such cases than in the case of laser-powder build-up welding, and because rapid heat dissipation is advantageous for preventing deformation as a result of the thermal input.

Whereas the basic material and the cutting body preferably have a thermal conductivity of less than 100 Watts per Kelvin-meter, the support for the plasma-powder build-up welding preferably has a thermal conductivity of more than 200 Watts per Kelvin-meter, or even better of 300 Watts per Kelvin-meter.

The cutting body is sharpened in various ways to form the at least one cutting edge, for example in such a way that the cutting body tapers to a point on one side or on two sides, or has a planar section which is perpendicular or at an angle to the base area of the main body.

In another embodiment of the blade, the joining line may be furnished with a groove, which allows a more durable join between the cutting body and the main body. The groove is therefore filled with the second material during build up-welding.

In one preferred embodiment, build-up welding along the joining line is performed by means of a guided arc which oscillates alternately away from the joining line and toward the joining line and is thus guided in such a way that the second material is build-up welded in sections along the joining line in a substantially perpendicular direction to the joining line, and the cutting body is formed by material sections which are formed perpendicularly by build-up welding and which are subsequently joined to one another.

In the case of a round main body, the weld beam is guided in the radial direction alternately toward and away from the blade center, so that the material portions fused to each other are joined to each other in the circumferential direction.

In one preferred embodiment of the blade, the joining line is formed by a planar portion on the main body. In an alternative preferred embodiment, the joining line is formed by a cylinder lateral surface portion or cone lateral surface portion radially attached to the main body.

Both of the aforementioned embodiments have the advantage that a large part of the second material of the cutting body can be used to form the cutting edge, as neither a groove or any similar recess in the main body is filled with the second material, nor is any flattened protrusion of the main body provided to support the cutting body. Any post-processing of the blade is also made more simple, in that the used cutting body can be easily separated, whereas in the case of joining lines with a groove or similar receptacle, the material of the cutting body must also be removed from such a groove or from the similar receptacle before build up-welding can be carried out again, which is a relatively complicated procedure.

Alternatively, it is also conceivable to have the main body and the cutting body joined detachably by gluing or the like, which has the advantage that all of the harder cutting edge can be removed and replaced with a new cutting edge when the entire resharpening region has been depleted. The main body can thus be used on a longer-term basis. The costs for the user are reduced substantially as a result.

In this embodiment, the blade according to the invention can be resharpened particularly frequently in relation to the size of the cutting body, thus increasing not only its service life, but also the service life of the blade according to the invention.

The portion forming the joining line preferably extends—according to the direction of that area of the main body to which the cutting body is attached—in a direction running substantially perpendicular to, or at a slight angle to the base area of the main body, for example at an angle of between 90° and 45° or between 90° and 135° to the base area of the main body.

In other embodiments, in particular in such embodiments in which the main body consists not only of the first material, but also of another material, for example with a coated main body, it may be advantageous if the joining line is formed not only by one single section, but by two or more sections at an angle to each other, for example.

The support used for producing the blade is preferably a copper support, as copper has an especially high thermal conductivity. According to the knowledge of the inventor of the present invention, the advantageous effects described above can be achieved by a copper support, in particular. However, copper alloys or other third materials having a high thermal conductivity are also conceivable.

The support onto which the main body is placed advantageously has a recess with a base area which is larger than the base area of the main body. The base area of the main body placed onto the support and the base area of the recess define a differential area which in turn defines a base area of the cutting body. Accordingly, the second material is preferably build-up welded in such a way that it fills the space between the joining line of the main body, the differential area and an end of the recess. The support thus causes particularly fast dissipation of heat from the second material used for build-up welding and achieves appropriate weld pool backing. The degree of mixing with the basic material in the transition zone is 5% at a maximum.

In another preferred embodiment, the recess in the support is formed by at least two planar areas, namely by a first plane having a circumferential profile which is substantially identical to the circumferential profile of the base area of the main body, and a second, lower plane having a circumferential profile that defines the target base area of the cutting body. The cutting body in this embodiment of the blade thus has a protrusion which is advantageous for certain applications.

In one preferred embodiment, the first material is preferably a corrosion-resistant steel, for example a steel having Z-40.21, Z-40.23, Z- or 43.01 as material code.

The second material, in both plasma-powder build-up welding and in laser-powder build-up welding, is preferably an iron alloy composed, for example, of the following materials: chromium (Cr), vanadium (V), molybdenum (Mo), manganese (Mn), silicon (Si), carbon (C) and nickel (Ni), e.g. with the following approximate compositions: 15% Cr, 15% V, 1.3% Mo, 0.9% Mn, 0.9% Si, 4.2% C, 2% Ni and the rest iron. Similar alloys can likewise be used, for example an alloy with the following approximate composition: 4.4% C, 0.9% Si, 17% Cr, 0.9% Mn, 2.0% Mo, 15% V, 3.0% Ni and the rest iron. The inventive blade having such a cutting body is distinguished by a particularly long service life.

The main body of the blade according to the invention preferably consists of the first material only. A coating of the main body is not necessary in most embodiments, as the material of the main body is already corrosion-resistant. Due to the cutting body being made of the second material, it is likewise unnecessary to have a particularly high percentage of carbon in the corrosion-resistant steel in order to harden the material of the main body.

At the most, the main body of the inventive blade has a coating to produce an anti-stick effect, in other words a coating of the kind that counteracts the material to be cut from sticking to the main body.

The cutting body of the blade according to the invention extends away from the main body, for example over a distance of between 5 and 25 mm.

At the joining line, the cutting body in the unprocessed state is up to 4 mm thick, for example. If the thickness is greater, it may be advantageous if the joining line is not formed by one planar portion alone, but if a pre-milled groove or similar receptacle for the cutting body is provided in the main body.

The cutting body of the blade according to the invention may be hardened such that the cutting body acquires a hardness of between 42 and 56 HRC (Rockwell Hardness C).

In one preferred embodiment, the base area of the blade according to the invention is circular and the cutting body is joined radially to the main body. The main body of the inventive blade may be quenched and tempered/hardened and thus have a basic hardness of up to 45 HRC. In many cases, however, quenching and tempering or hardening is not required, particularly when the main body has sufficient stiffness due to its being sufficiently thick, or having a special constructional design. This is also the case, in particular, when rustproof steels are used, or when sufficient corrosion protection is achieved by using special coating methods.

A second aspect of the present invention relates to a method for producing a blade for cutting machines, wherein the blade has a main body made of a first material and a cutting body made of a second material and having at least one cutting edge formed thereon, wherein the second material has a higher hardness than the first material and the cutting body is joined along a joining line to the main body, said method comprising the following steps:
providing a support made of a third material of high thermal conductivity;
placing the main body on the support such that a base area of the main body and a surface of the support lie substantially parallel to each other and the fit location is adjacent the surface of the support;
generating the cutting body by build-up welding of the second material onto the first material along the joining line, the support being arranged for mechanically supporting the second material used for build-up welding and
sharpening the cutting body to form the at least one cutting edge.

The inventive method according to the second aspect of the present invention shares the advantages of the blade according to the first aspect of the present invention. More particularly, the method according to the second aspect of the invention has preferred embodiments which essentially correspond to the additional features of the embodiments of the blade according to the first aspect, as described above. This also applies specifically to the material properties of the main body, the cutting body and the support.

According to a third aspect of the present invention, the aforesaid technical problem is solved by a blade for cutting machines, comprising a main body made of a first material and a cutting body made of a second material and having at least one cutting edge formed thereon, wherein the second material has a higher hardness than the first material and the cutting body is joined along a joining line to the main body and wherein the blade is produced by:
placing the main body on the support such that a base area of the main body and a surface of the support lie substantially parallel to each other and the joining line extends along a side of the main body facing away from the surface of the support;
generating the cutting body by laser-powder build-up welding of the second material onto the first material along the joining line such that the cutting body is formed laterally adjoining the main body, and
sharpening the cutting body to form the at least one cutting edge.

This aspect of the invention includes the realization that, due to the use of laser-powder build-up welding, only a relatively small amount of thermal input into the main body and the support is caused during the melting process, with the result that a support having a particularly high thermal conductivity, such as a copper support, is not necessary in order to achieve the advantages already explained with regard to the first aspect of the invention. Nevertheless, such a support with a high thermal conductivity can also be used for the production process in respect of the blade according to the third aspect of the invention.

In comparison to a cutting body that is joined radially to the main body, joining the cutting body laterally to the main body has the advantage that simultaneous cutting and separation is achieved in an improved manner during subsequent cutting with the blade according to the third aspect of the invention. The cutting body may be joined to the main body in the form of a thin coating, or in the form of a thick coating.

In the subsequent sharpened state, the cutting body preferably has
a cutting thickness in the sharpened state of approximately 1-3 mm,
a cutting width (depending on requirements) of approximately 15 to 20 mm over the entire resharpening region and
a hardness of the cutting edge of between 59 and 62 HRC (depending on requirements).

Other advantageous embodiments of the blade according to the third aspect are identical, as far as technically possible, with the advantageous embodiments of the blade according to the second aspect, in particular with regard to specified dimensions and materials, such as layer thicknesses and layer widths.

Corresponding to the third aspect, a method for producing a blade for cutting machines is proposed, according to a fourth aspect of the invention, wherein the blade has a main body made of a first material and a cutting body made of a second material and having at least one cutting edge formed thereon, wherein the second material has a higher hardness than the first material and the cutting body is joined along a joining line to the main body, said method comprising the following steps:
placing the main body on the support such that a base area of the main body and a surface of the support lie substantially parallel to each other and the joining line extends along a side of the main body facing away from the surface of the support;
generating the cutting body by laser-powder build-up welding of the second material onto the first material along the joining line such that the cutting body is formed laterally adjoining the main body, and
sharpening the cutting body to form the at least one cutting edge.

Figure 8:
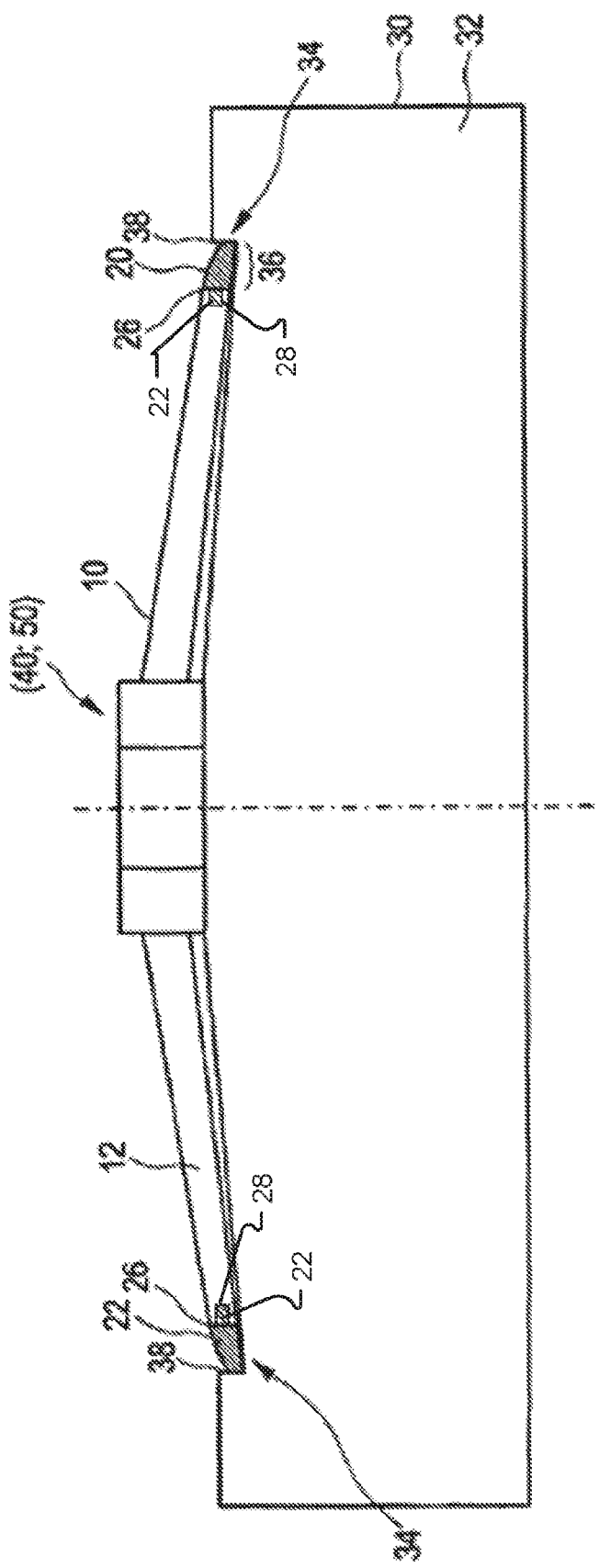

Other advantages of the blade according to the first and third aspects of the invention shall now be described with reference to the drawings, in which FIGS. 1 to 7 and 9 show, each in a schematic view, various configurations of the main body and cutting body of the blade according to the invention. FIG. 8 shows, likewise in schematic view, a main body placed upon a support, after application of a cutting body.

Figure 9:
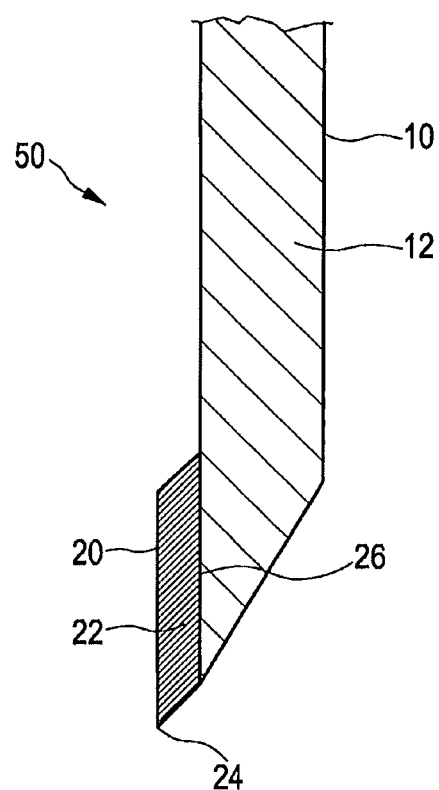

FIG. 1 and FIG. 9 each show, in schematic view, a partial cross-section of a preferred embodiment of the inventive blade 40 or 50. The inventive blade 40/50 is executed in joined form and comprises a main body 10 made of a first material 12 and a cutting body 20 made of a second material 22. The second material 22 has a higher hardness than the first material 12. Cutting body 20 is joined to main body 10 along a joining line 26.

The material 12 which is used is preferably, but not invariably, a rustproof or corrosion-resistant steel, for example 1.4006, 1.4021, 1.4024, 1.4301m S355.

The second material 22 is preferably an iron-based alloy and is build-up welded along joining line 26, preferably by plasma-powder build-up welding, also known as plasma transferred arc (PTA) welding, or by laser-powder build-up welding.

Before build up-welding of the second material 22, a support 30 made of a third material 32 of high thermal conductivity, shown in more detail in FIG. 8, is provided for the blade 40 according to FIGS. 1 to 7. The main body 10 of the blade to be produced is placed on support 30 such that a base area of main body 10 and a surface of support 30 lie substantially parallel to each other and joining line 26 is adjacent the surface of support 30. Support 30 is arranged for mechanically supporting the second material 22. Cutting body 20 of the blade is then sharpened to form a cutting edge 24.

In the embodiments of the blade shown in FIGS. 1 to 3 and 5 to 7, joining line 26 is formed, for example, by a planar portion or a cylinder lateral surface portion or a cone lateral surface portion. In the embodiments according to FIGS. 3, 5, 6 and 7, the portion forming joining line 26 lies perpendicular to the base area of main body 10. Alternatively, the portion is at a slight angle of approximately 70° to the base area of main body 10, as in the embodiments shown in FIGS. 1 and 2, for example.

Figure 2:
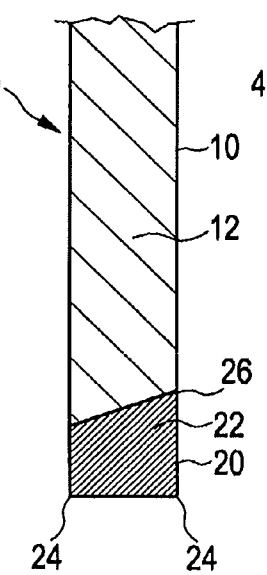
Figure 3:
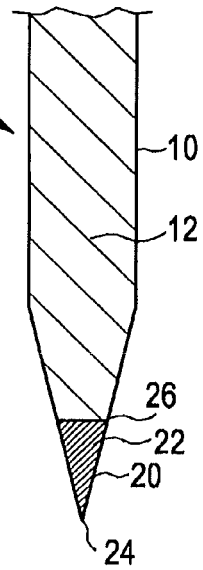

Cutting body 20 can be sharpened to form cutting edge 24 in various ways, as shown in FIGS. 1 to 7, for example in such a way that cutting body 20 tapers to a point either on one side (FIG. 1 and FIGS. 4 to 6) or on two sides (FIGS. 3 and 7), or does not have any sharp top, but two edges instead (FIG. 2)

Figure 4:
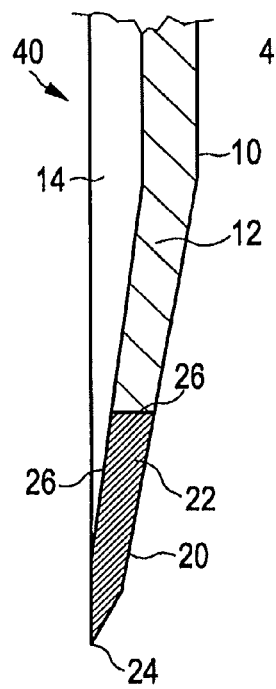
Figure 5:
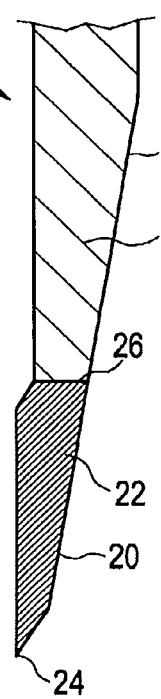
Figure 6:
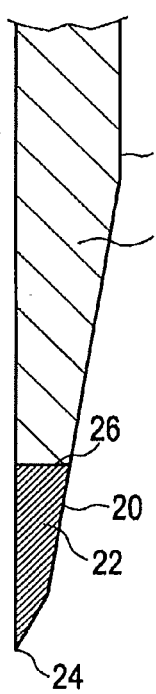
Figure 7:
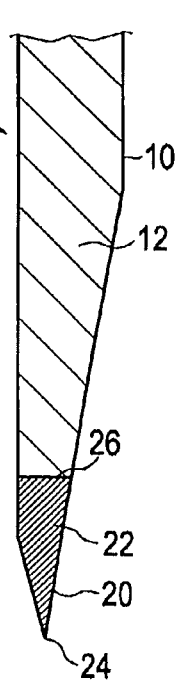

FIG. 4 shows an embodiment in which main body 10 consists not only of the first material 12 but also of another material 14. The other material 14 is a coating material, for example.

FIG. 8 shows a blade lying on support 30 and composed of a main body 10 and a cutting body 20 joined together. The material 32 of support 30 is preferably copper or a copper alloy. Support 30 has a recess 34 into which the main body 10 is placed. The base area of recess 34 is larger than the base area of main body 10. The base area of support 30 and the base area of main body 10 define a differential area 36 which defines a base area of cutting body 20. Accordingly, the second material 22 is build-up welded in such a way that it substantially fills the space between joining line 26 of main body 10, differential area 36 and an end 38 of recess 34. Support 30 thus causes particularly fast dissipation of heat from the material 22 used for build-up welding and achieves appropriate weld pool backing. The joining line 26 may be furnished with a groove 28 which is filled with the second material 22 during build up-welding.

In the case of blade 50 in FIG. 9, build-up welding onto cutting body 20 is performed by means of laser-powder build-up welding, in which a support having a high thermal conductivity does not necessarily need to be provided. According to FIG. 9, main body 10 was first placed on the support in such a way that a base area of main body 10 and a surface of the support lay substantially parallel to each other and the joining line extended along a side of the main body facing away from the surface of the support. Cutting body 20 was then generated by laser-powder build-up welding of the second material 22 onto the first material 12 along joining line 26 such that cutting body 20 was formed laterally adjoining main body 10.

In comparison to a cutting body that is joined radially to the main body, joining the cutting body laterally to the main body has the advantage that simultaneous cutting and separation can be achieved in an improved manner during subsequent cutting with the blade.

The invention claimed is:

1. A method for producing a blade for cutting machines, wherein the blade has a main body made of a first material and a cutting body made of a second material and having at least one cutting edge formed thereon, wherein the second material has a higher hardness than the first material and the cutting body is joined along a joining line to the main body, said method comprising the following steps:
   providing a support made of a third material wherein the thermal conductivity of the third material is higher than the thermal conductivity of the first material and the second material;
   placing the main body on the support such that a base area of the main body and a surface of the support lie substantially parallel to each other and the joining line is adjacent the surface of the support;
   generating the cutting body by build-up welding of the second material onto the first material along the joining line, the support being arranged for mechanically supporting the second material used for build-up welding; and
   sharpening the cutting body to form the at least one cutting edge, wherein the support onto which the main body is placed has a recess with a base area which is larger than the base area of the main body, wherein the base area of the main body placed onto the support and the base area of the recess define a differential area which defines a base area of the cutting body.

2. The method according to claim 1, wherein the cutting body is generated by plasma-powder build-up welding.

3. The method according to claim 1, wherein the cutting body is generated by laser-powder build-up welding.

4. The method according to claim 1, wherein the joining line has a groove which is filled with the second material during build-up welding.

5. The method according to claim 1, wherein build-up welding along the joining line is performed by means of a guided arc which swings pendulously away from the joining line and toward the joining line and is thus guided in such a way that the second material is build-up welded in sections along the joining line in a substantially perpendicular direction to the joining line and the cutting body is formed by material sections which are formed perpendicularly by build-up welding and joined to one another.

6. The method according to claim 1, wherein the joining line is formed by a planar portion on the main body.

7. The method according to claim 1, wherein the joining line is formed by a lateral surface portion of a cylinder or a cone radially adjoined to the main body.

8. The method according to claim 1, wherein the support is a copper support.

9. The method according to claim 1, wherein the recess in the support is formed by at least two planar areas, namely by a first plane having a circumferential profile which is substantially identical to the circumferential profile of the base area of the main body, and a second, lower plane having a circumferential profile that defines the base area of the cutting body.

10. The method according to claim 1, wherein the first material is a corrosion-resistant steel.

11. The method according to claim 1, wherein the main body consists solely of the first material.

12. The method according to claim 1, wherein the second material is an iron-based alloy composed of the following materials: chromium, vanadium, molybdenum, manganese, silicon, carbon and nickel.

13. The method according to claim 1, wherein the cutting body extends away from the main body over a distance of between 5 and 25 mm.

14. The method according to claim 1, wherein the cutting body is up to 4 mm thick at the joining line.

15. The method according to claim 1, wherein the cutting body is hardened ultrasonically.

16. The method according to claim 1, wherein the base area of the main body is circular and the cutting body is joined radially to the main body.

\* \* \* \* \*